(12) United States Patent
Sarlashkar et al.

(10) Patent No.: US 12,442,863 B2
(45) Date of Patent: Oct. 14, 2025

(54) SYSTEMS AND METHODS FOR BATTERY PERFORMANCE MONITORING

(71) Applicant: Southwest Research Institute, San Antonio, TX (US)

(72) Inventors: Jayant Vitthal Sarlashkar, San Antonio, TX (US); Venkata Rajesh Chundru, San Antonio, TX (US); Bapiraju Surampudi, San Antonio, TX (US)

(73) Assignee: SOUTHWEST RESEARCH INSTITUTE, San Antonio, TX (US)

(*) Notice: Subject to any disclaimer, the term of this patent is extended or adjusted under 35 U.S.C. 154(b) by 141 days.

(21) Appl. No.: 18/407,535

(22) Filed: Jan. 9, 2024

(65) Prior Publication Data

US 2024/0230778 A1    Jul. 11, 2024

Related U.S. Application Data

(60) Provisional application No. 63/479,030, filed on Jan. 9, 2023.

(51) Int. Cl.
| | | |
|---|---|---|
| G01R 31/389 | (2019.01) | |
| G01R 31/36 | (2020.01) | |
| G01R 31/378 | (2019.01) | |
| G01R 31/3842 | (2019.01) | |
| G01R 31/392 | (2019.01) | |
| H01M 10/0525 | (2010.01) | |

(52) U.S. Cl.
CPC ....... *G01R 31/389* (2019.01); *G01R 31/3646* (2019.01); *G01R 31/378* (2019.01); *G01R 31/3842* (2019.01); *G01R 31/392* (2019.01); *H01M 10/0525* (2013.01)

(58) Field of Classification Search
None
See application file for complete search history.

(56) References Cited

U.S. PATENT DOCUMENTS

2023/0064748 A1* 3/2023 Liu .............. H02J 7/0047

* cited by examiner

*Primary Examiner* — Jas A Sanghera
(74) *Attorney, Agent, or Firm* — Grossman, Tucker, Perreault & Pfleger, PLLC (57) ABSTRACT

Battery testing and monitoring by determining battery characteristics such as an increase thickness of the battery SEI layer, extent of lithium-ion plating, loss of cyclable lithium, dendrite growth (and extent), and/or other characteristics that may impact the performance and/or safety of a lithium-ion battery. The battery characteristics may be determined at perioding intervals using test data that includes voltage and current at various charging levels and state of charge, thus providing impedance profiles that can be compared to modelled and/or known thresholds of battery conditions.

24 Claims, 9 Drawing Sheets

SYSTEMS AND METHODS FOR BATTERY PERFORMANCE MONITORING

CROSS REFERENCE TO RELATED APPLICATIONS

This application claims the benefit of U.S. Provisional Application Ser. No. 63/479,030, filed 9 Jan. 2023, which is hereby incorporated by reference in its entirety.

FIELD

The present disclosure relates to systems and methods for battery performance monitoring, and, more particularly, to systems and methods to detect and quantify performance degradation and lithium plating in a lithium-ion cell.

BACKGROUND

Lithium-ion cell suffers reduced performance as it ages. Charge capacity (ampere-hour) and power capability (Watts) are typical performance metrics. There are several mechanisms such as growth of the passivation layer at the interface of the electrodes and the electrolyte (solid-electrolyte-interface SEI), lithium plating at the anode, loss of active sites in the electrodes, reduced kinetics, increase in bulk resistance etc. that result in reduced performance and safety. This has been a long-standing challenge and it is becoming more relevant at the lithium-ion batteries are deployed at a rising rate in electric power grid and transportation.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The industry standard model of a lithium-ion cell represents nominal physics through mass and charge conservation, and matching boundary conditions at the interface of electrodes and electrolyte. However, the standard model does not incorporate representation of ageing mechanisms described above. The system and methodology described herein includes behavioral representation of the ageing mechanisms (such as loss of cyclable lithium) and a real-time test protocol to keep the model true to reality and estimate degradation in performance and safety.

Figure 1:
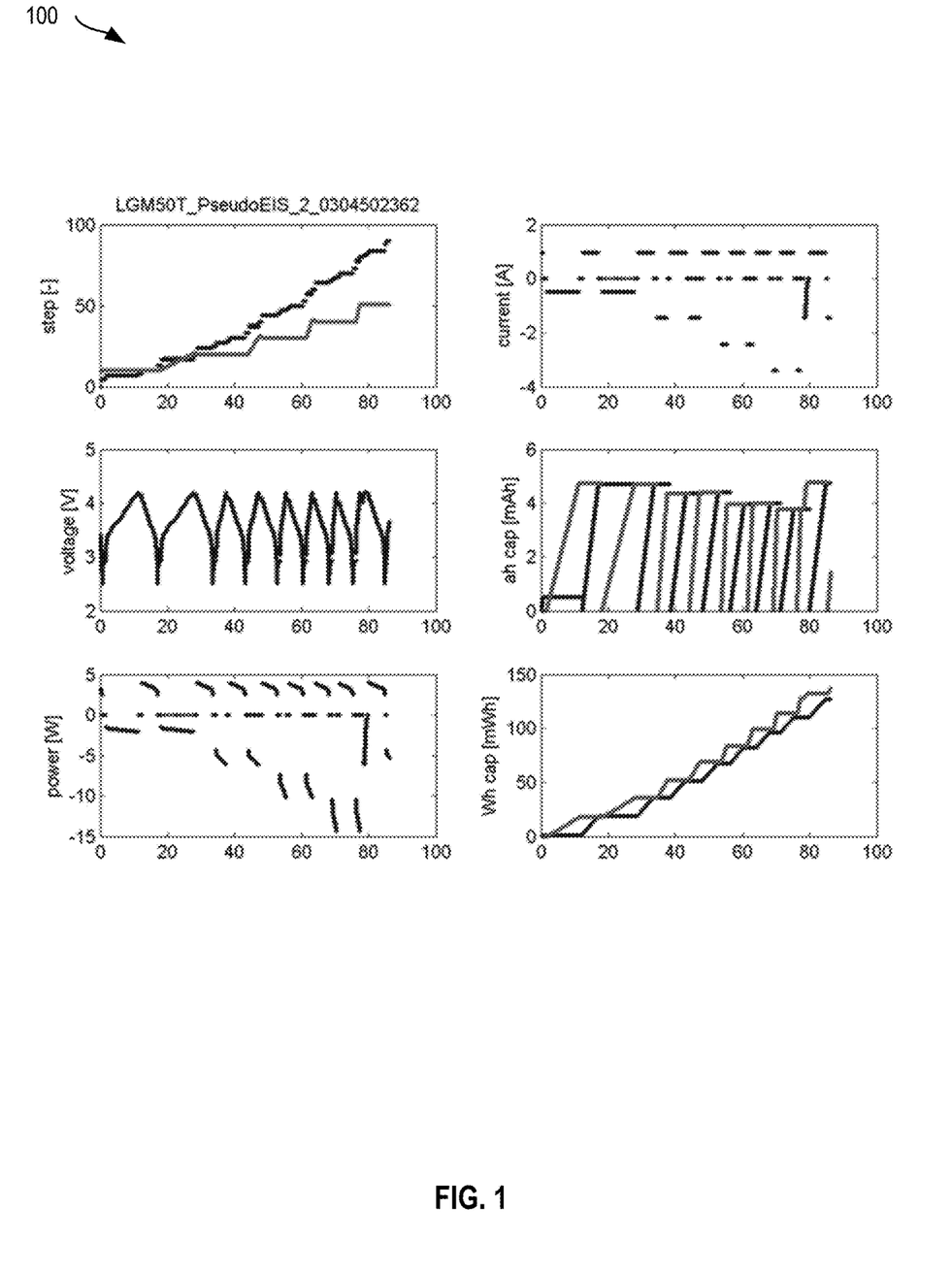
FIG. 1 illustrates plots of a pseudo-EIS test protocol performed on a subject lithium-ion battery in accordance with several embodiments of the present disclosure.

The so-called pseudo-EIS (Electrochemical Impedance Spectroscopy) test protocol subjects the battery in question to various levels of charging current with periodic interruption in charging. FIG. 1 illustrates plots of a pseudo-EIS test protocol performed on a subject lithium-ion battery (in this example, the test battery is an LG M50T battery manufactured by LG). In the upper-right panel of FIG. 1, a battery with a nominal charge capacity of 5 Amp*hours (Ah) is subjected to four levels of (constant) charging current of 0.5 Amps (A), 1.5 (A), 2.5 (A), and 3.5 (A) (with interspersed discharge). The middle-left, lower-left, middle-right, and lower-right panels of FIG. 1 respectively show the voltage and power measured at the terminals, and the coulombic charge and energy supplied or extracted from the battery during the charge/discharge protocol. The upper-left panel of FIG. 1 shows the bookkeeping of the step and cycle number during the protocol that allows the correct grouping of the calculated resistance or impedance values described in the following. The pseudo-EIS protocol may be an algorithm (e.g., hard-coding, etc.) that is incorporated into known battery charging circuitry to charge a lithium-ion battery, and such pseudo-EIS algorithms are well known and established in the art. The present disclosure expands on the pseudo-EIS protocol to provide a clearer picture of the overall performance and safety of a lithium-ion battery. As illustrated in FIG. 1, the pseudo-EIS protocol generates test data that includes battery voltage (V), battery current (I), battery power (W), and battery capacity (A-Hr and W-Hr). This test data may be used by the present disclosure to determine additional battery characteristics such as increase thickness of the battery SEI layer, extent of lithium-ion plating, loss of cyclable lithium, dendrite growth (and extent), and/or other characteristics that may impact the performance and/or safety of a lithium-ion battery. In embodiments described herein, the test data is used to determine resistance values (charging resistance, Rc, and/or discharging resistance, Rd) over a range of charging currents and charge levels, and at selected and/or predefined intervals. The resistance values, and in particular, changes in resistance values over time, may provide performance and/or safety characteristics of the battery.

Figure 2:
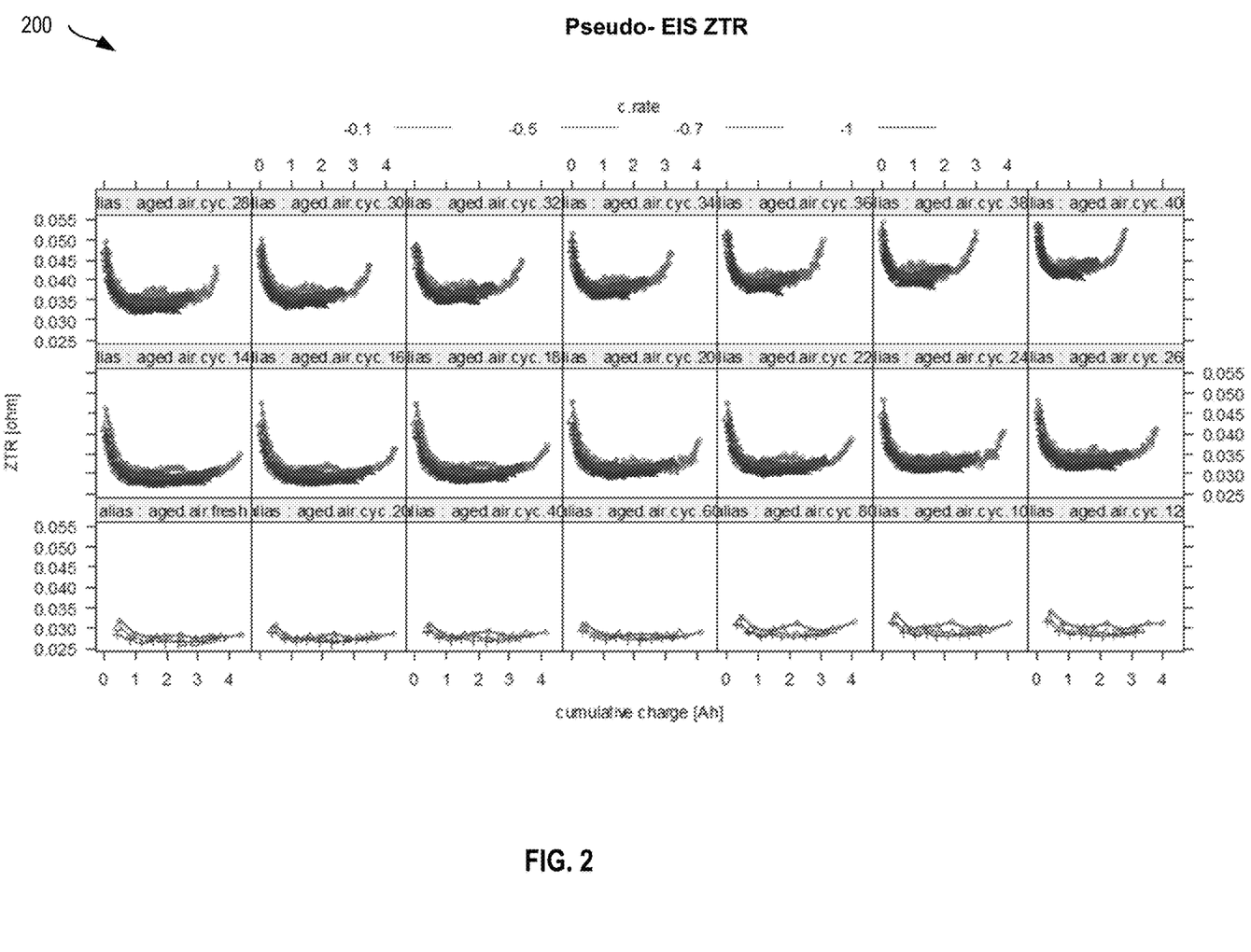
FIG. 2 illustrates plots of determined impedance (vertical axis) during a pseudo-EIS protocol, and illustrates the impedance (ZTR) increasing as the battery ages from a fresh battery (lower left plot) to 400 recharge cycles (upper right panel) according to one embodiment of the present disclosure.
Figure 3:
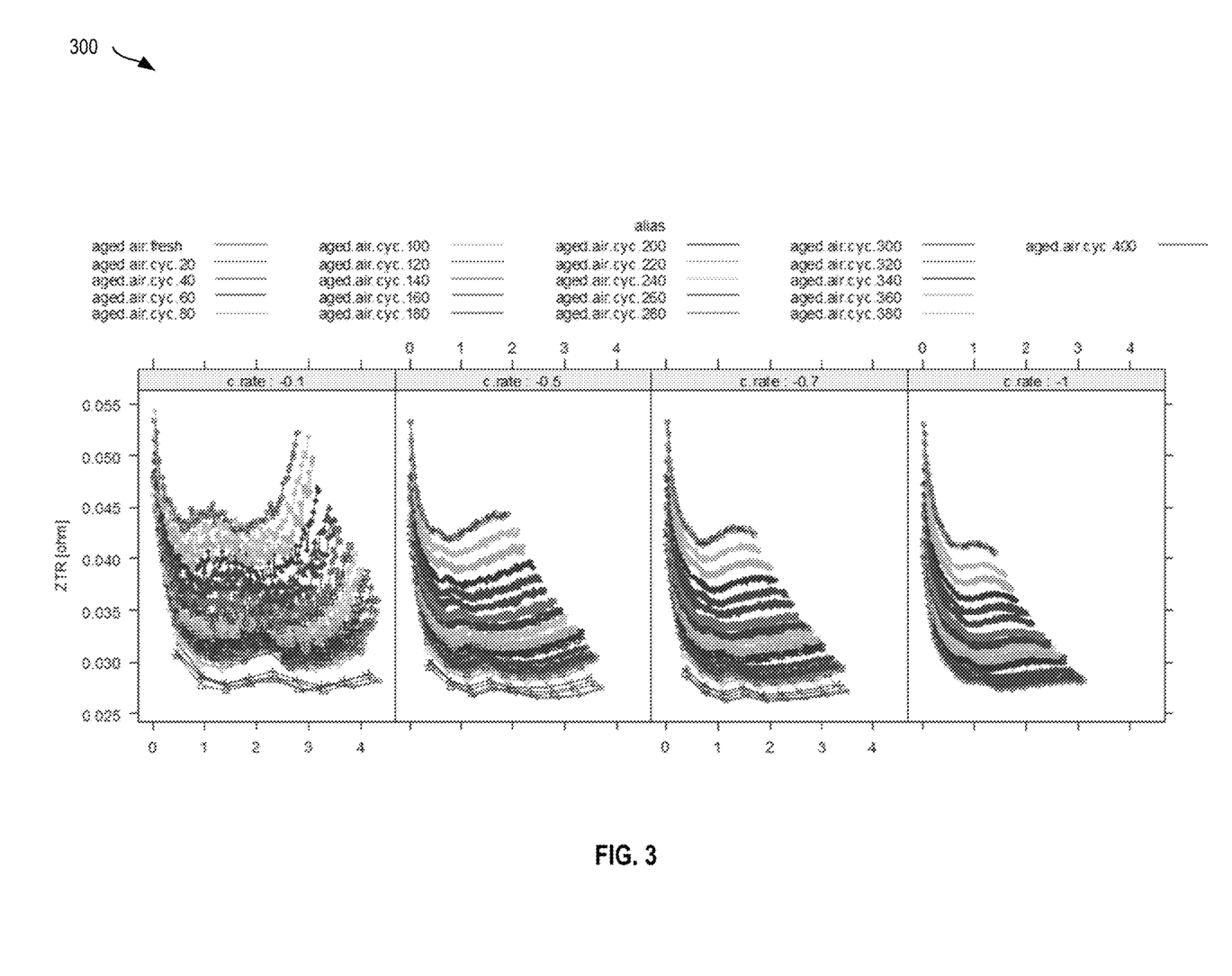
FIG. 3 illustrates plots of the determined impedance values, grouped together by the level of test current of FIG. 2 according to one embodiment of the present disclosure.

FIGS. 2 and 3 illustrate plots of the impedance values determined using the data from the pseudo-EIS protocol of FIG. 1 for the LG M50T test battery. In particular, FIG. 2 illustrates a series of plots 200 of determined impedance (vertical axis), represented as terminal impedance (ZTR) in Ohms, during a pseudo-EIS protocol, and illustrates the impedance increasing as the battery ages from a fresh battery (lower left panel plot) to 400 recharge cycles (upper right panel plot). Each panel in FIG. 2 corresponds to the pseudo-EIS test performed every 20 charge/discharge cycles, starting with a fresh battery (lower left) to 400 charge/discharge cycles (upper right). In each panel, there are four impedance (ZTR) curves as a function of cumulative charge (i.e., state-of-charge (SOC in Ah)). The impedance curves correspond to charging at normalized charging currents of a maximum charging current for this example battery type. Thus, for example, of −0.1 represents 10% of maximum charging current, −0.5 represents 50% maximum charging current, and so on.

FIG. 3 illustrates a series of plots 300 of the determined impedance values of FIG. 2, grouped together by the level of test current of FIG. 2. Each panel in FIG. 3 corresponds to the tests at a specific (normalized) level of charge current. The lines in each panel of FIG. 3 correspond to the impedance (ZTR) as a function of the state-of-charge determined after a specific number of cycles. The following observations may be derived from FIGS. 2 and 3:

The impedance increases as the cell ages, as illustrated by the upward movement of the four impedance curves (as a group) in the upper row of FIG. 2. The inventors herein have determined that this phenomenon illustrates degradation of power capability resulting from increase in the thickness of the SEI layer.

The separation between the impedance measured at the lowest normalized charging current (−0.1) and the highest normalized charging current (−1) increases as the cell ages, for example, as seen in the four curves of the upper right panel plot of FIG. 2 (representing testing at 400 charge/discharge cycles). The inventors herein have determined that this phenomenon illustrates a result of lithium plating.

The right endpoint of the curves in each panel of FIGS. 2 and 3 occurs at lower and lower abscissa as the cell ages. In addition, as the cell ages, the right end points of higher battery charging currents tend to slope negative. The inventors herein have determined that this phenomenon illustrates degradation resulting from loss of cyclable lithium (i.e., non-recoverable lithium), and the start of dendrite growth on the anode and/or cathode of the cell (excessive lithium plating).

The inventors herein have observed that lithium plating occurs when the algebraic constraint (Kirchoff's law) that the ionic current in the electrolyte and the ionic transport in the electrode match, is not satisfied. This results in a new "sink" for the unsatisfied lithium—and plating occurs. Once plating occurs, the electrode potential of the anode increases causing further mismatch in the ionic currents. Plating may be undone if enough rest is provided, otherwise it may continue as a positive feedback manner resulting in an accelerated degradation/failure of the battery.

Figure 4:
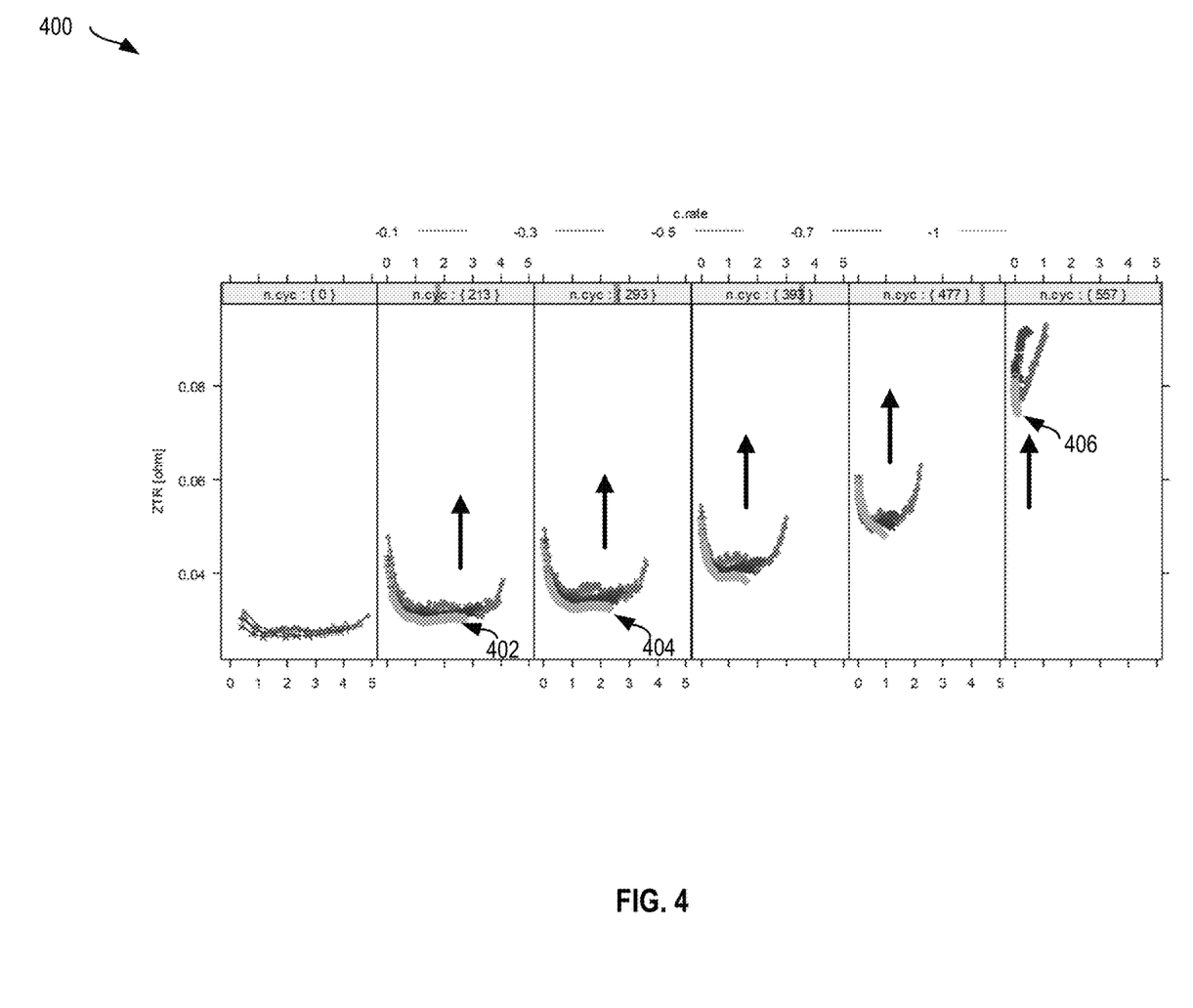
FIG. 4 illustrates plots of determined impedance (ZTR) versus cumulative charge, similar to FIG. 2, according to one embodiment of the present disclosure.

These observations are illustrated in FIG. 4, which illustrates plots 400 of determined charge impedance (ZTR) versus cumulative charge for five (5) different normalized charging currents (−0.1, −0.3, −0.5, −0.7, and −1), similar to FIG. 2. For example, −1 and −0.1 correspond to 100% and 10%, respectively, of the rated charging current of the cell, where the minus sign indicates charging. As illustrated in FIG. 4, the impedance curves (groups) drift upward as the number of cycles (n_cyc) increases. This represents the overall degradation of the cell resulting from various internal mechanisms. The rightmost point of each curve, an example of which is shown at 402 for the normalized charging current of 1 at 213 charge/discharge cycles, corresponds to the charge capacity of the cell in A*hr. Note that, at a given level of the charge current, the rightmost point moves left as the number of cycles (n_cyc) increases—that is the capacity decreases, as illustrated by comparing endpoint 402 to 404. This is due to the constraint of the maximum allowable terminal voltage of the cell such that a charging controller (not shown) discontinues using the highest available charging current and must reduce charging current to ensure the terminal voltage of the cell does not exceed the maximum voltage constraint. In addition, the early termination of maximum charging current indicates an overall reduction in the inventory of cyclable lithium. As can be appreciated, the plots of FIG. 4 indicate that as a cell ages, the availability of the cell to use larger charging currents decreases, which in turn leads to an increase in charging time, and a decrease in overall charge capacity of the cell (in Ah). For a given cumulative charge [Ah], the charge resistance is lower at the higher level of current. This may be a result of alternative parallel paths that the current seeks—and lithium plating is a likely reason.

This observation of the nonlinearity of resistance with respect to charge current is an indication of loss of cyclable lithium and/or lithium plating and dendrite growth. The separation between the resistance at the lowest charging level (−0.1) and the highest charging level (−1) increases as lithium plating worsens. This is shown dramatically in the rightmost panel, in which the right endpoint 406 of the maximum charging current is significantly shortened and the overall charge capacity of the cell has decreased from approximately 5 Ah. to approximately 1 Ah. As will be described in greater detail below, it is these observations that the present disclosure utilizes to develop charging (or discharging) thresholds that will cause a battery charging controller (not shown) to reduce charging current before these effects occur to extend the life of the cell and to prevent excessive lithium plating and dendrite growth, which can have significant fire and safety concerns.

The thresholds for the battery aging model are identified by analysis of Pseudo EIS tests. The thresholds are identified to target following aging mechanisms:
1. SEI growth rate (recoverable lithium)
2. Lithium plating state (irrecoverable lithium stored on anode surface)
3. Dendrite growth rate (once a dendrite growth rate has been predicted to exceed an experimentally-derived threshold, the battery should be taken out of service to prevent a fire hazard).

Figure 5:
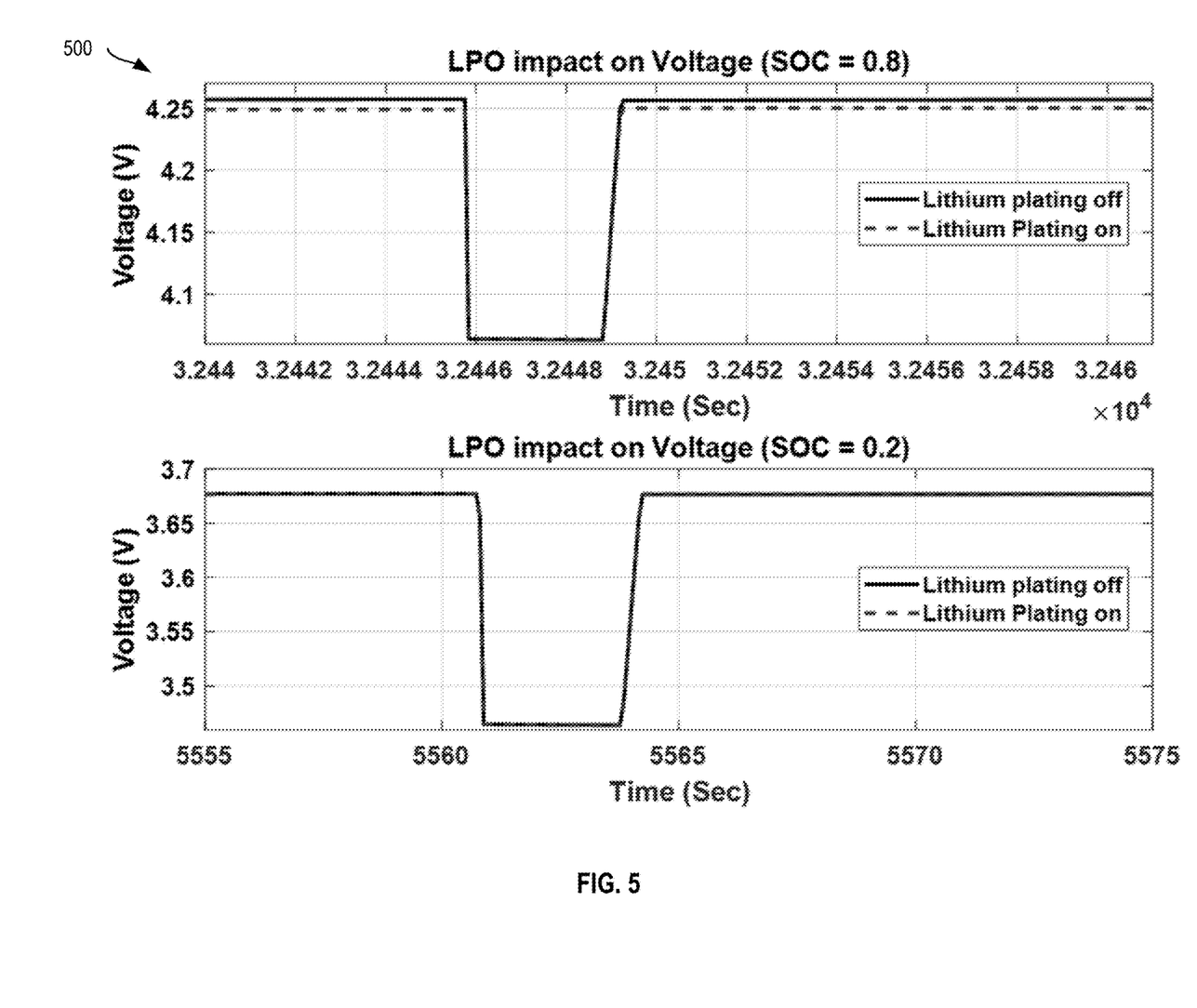
FIG. 5 represents voltage plots of a charge interruption event at SOC 0.2 and 0.8 according to one example embodiment of the present disclosure.

As described below, determination of ZTR is performed during charging (or discharging) using interruptions of charging (or discharging) to make ZTR measurements. FIG. 5 represents voltage plots of a charge interruption event at SOC 0.2 and 0.8.

The ohmic drop in voltage during interruption phase of pseudo-EIS enables calibration of SEI growth rate side reaction parameters. The drop in resistance for steady state part of interruption in pseudo-EIS will be used to calibration the lithium plating state. A subset of the lithium stored in lithium plating state will be attributed to dendritic growth. The ratio of irrecoverable growth attributed to dendritic growth will be initially identified using destructive testing of cells further modification to this value will be based on data battery failures in real world cells.

At low SOC values such as 0.2 lithium plating is not expected, hence experimental observations with and without plating agree. At higher SOC, such as 0.8, plating is expected leading a increase in voltage during charge interruption compared to case without lithium plating, this delta in voltage value acts a reference for calibration of lithium plating state. In the case with no lithium plating (solid line) a higher internal resistance of the cell leads to a higher terminal voltage. For the case with lithium plating, the resistance is lower (based on observations from FIGS. 2 and 3), and this leads to lower voltage at SOC=0.8 state. The plots of FIG. 5 are illustrations of simulated drop in resistance when tracking lithium plating state.

Figure 6:
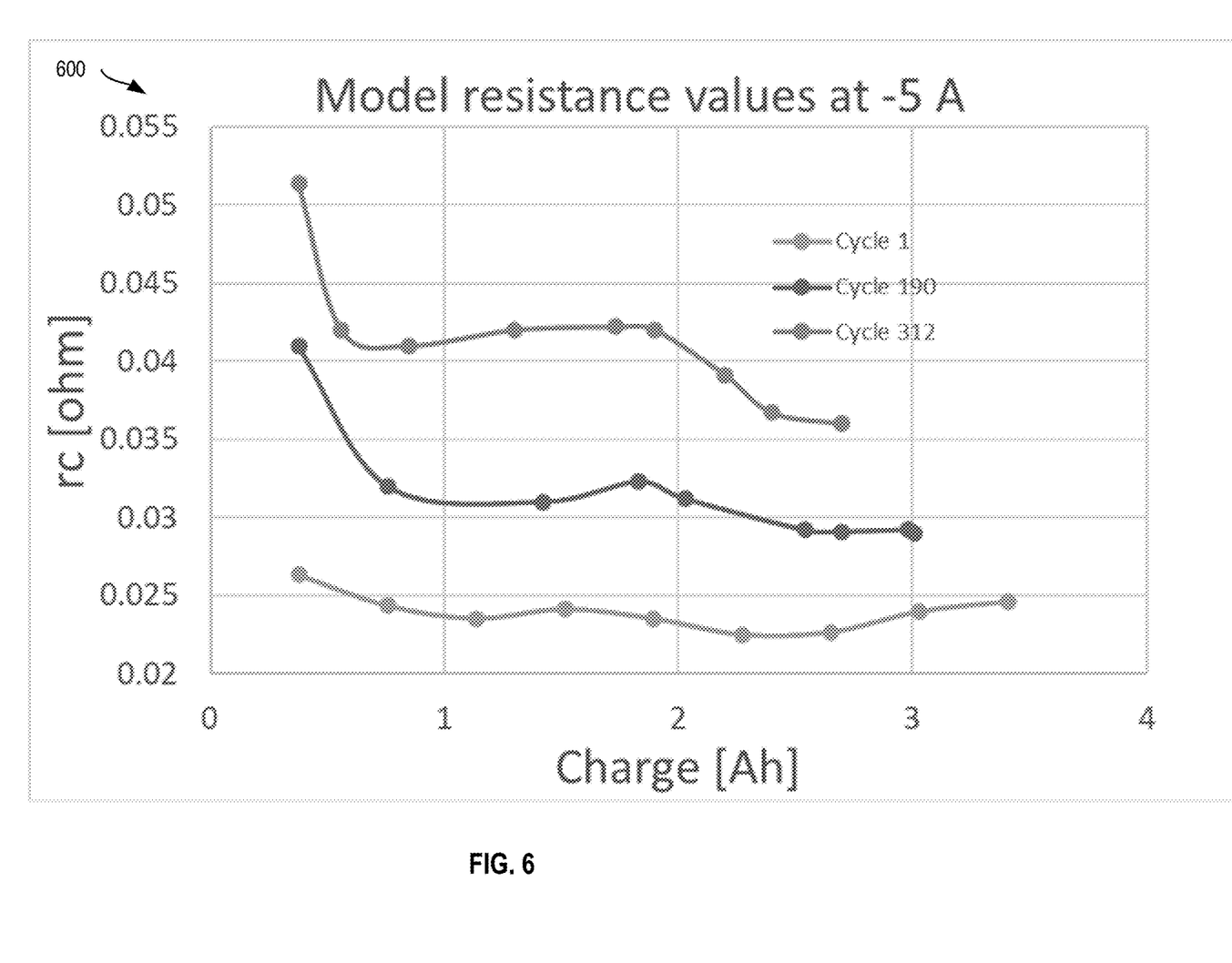
FIG. 6 presents the trend in dropping resistance of the cell at high SOC attributed to the lithium plating and dendrite growth and general increase in resistance of the cell attributed to the SEI layer growth according to one embodiment of the present disclosure.

As described herein, lithium plating has an impact on resistance and thus voltage in the cell. The deviation in voltage shown in second subplot is used to quantify the change in resistance caused by lithium plating which is used to track amount of lithium stored on anode. FIG. 6 presents the trend in dropping resistance of the cell at high SOC attributed to the lithium plating and dendrite growth and general increase in resistance of the cell attributed to the SEI layer growth. Both of these phenomena being quantified here using the pseudo-EIS data in real time during charge portion of battery cycle. Note the drop in resistance (rightmost part of each curve) at higher SOC levels, and an overall upward increase in resistance between 1 cycle, 190 cycles and 312 cycles. This is similar to the results seen in FIGS. 2-4.

Figure 7:
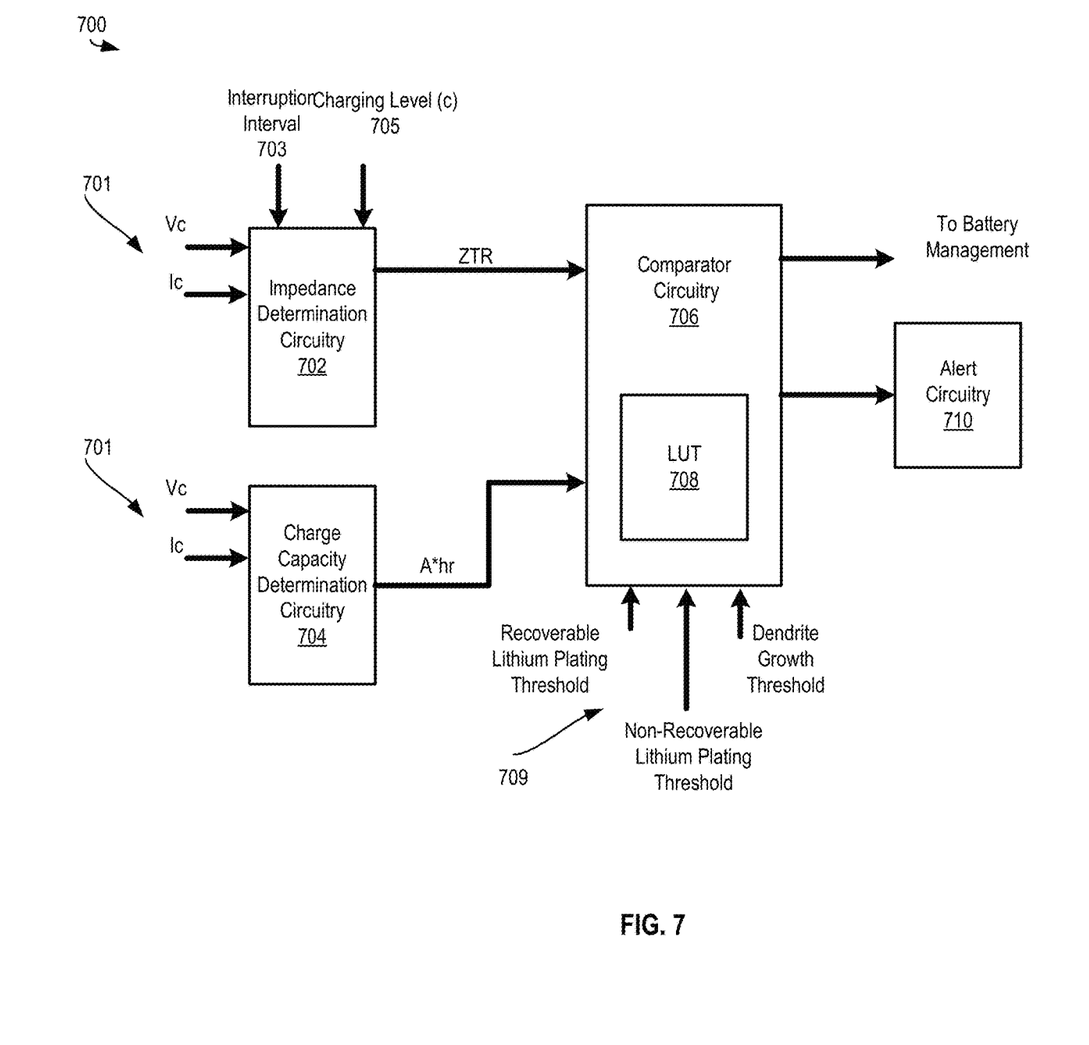
FIG. 7 illustrates an example system for monitoring battery performance and degradation according to one embodiment of the present disclosure.

FIG. 7 illustrates an example system 700 for monitoring battery performance and degradation according to one embodiment of the present disclosure. The system 700 includes impedance determination circuitry 702 generally configured to determine a charge and/or discharge impedance (Rc and/or Rd) based on battery voltage and current data 701 generated by a battery testing protocol, for example, a pseudo-EID protocol described above. As a general matter, impedance (resistance) may be determined using Ohm's law using the charging voltage (Vc) and charging current (Ic) values 701. In this embodiment, the impedance determination circuitry 702 is configured to interrupt a battery charging routine and determine a resistance value, Rc, during an interruption interval 703, where the interruption interval is selected to enable charging voltage Vc and charging current Ic to drop to a meaningful level to determine a resistance (e.g., 3 seconds). The impedance determination circuitry 702 is configured to interrupt the charge routine at each predefined incremental change in the battery charge level (e.g., interruption at each 1% of charge). Accordingly, the impedance determination circuitry 702 determines a plurality of resistance values (Rc) for a given charge current.

The system 700 of FIG. 7 may be incorporated with and/or formed as part of a battery management/charging system. As is known, a battery can be charged using a variety of charging levels. As illustrated in FIGS. 2-4, as the battery ages and in the presence of lithium plating, there tends to be a pronounced difference resistance between a low charging current value (e.g., 0.1 times the full charging current, as illustrated FIGS. 2-4) and a high charging current value (e.g., the full charging current, illustrated as the −1 (normalized) curves of FIGS. 2-4), and it is this difference in resistance (for a given battery age/cycle) that the present disclosure utilizes to determine thresholds for performance and safety characteristics. This difference becomes more pronounced as the battery ages, as illustrated in the left-most panel of FIG. 4 (new battery) compared to the right-most panels of FIG. 4 (aged battery measured at 557 charge/discharge cycles). Accordingly, at selected cycle intervals (e.g., every 100 cycles, etc.), the impedance determination circuitry 700 is configured to make a plurality of resistance (ZTR) determinations through at selected charging/discharging cycles. To reveal a resistance separation between low charging current and high charging current, the impedance determination circuitry 702 may command a battery charging system to use a low battery charging current for a selected cycle, and on the next cycle or nearest next cycle, command the battery charging system to use a high charging current (or vise-versa). This will enable the impedance determination circuitry 702 to be able to generate resistance results for a battery having approximately the same age for low current resistance values and high current resistance values. For each charging current that is used by a battery charger, each of these resistance values may be stored, for example in a look-up table (LUT) 908.

The system 700 may also include charge capacity determination circuitry 704 to determine a battery charge capacity (A hr) based on the charging voltage (Vc) and charging current (Ic) values 701.

The system 700 also includes comparison circuitry 706 generally configured to compare the resistance values generated using a low charging current to corresponding resistance values generated using a high charging current. Thus, for example, if there are 100 interruption intervals during charging and thus 100 resistance measurements for each of the low charging current and high charging current, the comparison circuitry 906 is configured to compare the low charging current resistance values with the high charging current resistance values for each interval. Thus, low charging current resistance value 1 (at interval 1) is compared to high charging current resistance value 1 (at interval 1), low charging current resistance value 2 (at interval 2) is compared to high charging current resistance value 2 (at interval 2), and so on. The comparison circuitry 706 is also configured to determine a maximum difference between a low charging current resistance and a high charging current resistance among all of the intervals (hereinafter "maximum delta resistance").

The comparison circuitry 706 is also configured to compare the maximum delta resistance to one or more thresholds 709 to determine degradation and or safety characteristics associated with the battery (i.e., battery aging characteristics). In this example embodiment, the comparison circuitry 906 is configured to compare the maximum delta resistance to a first threshold that represents a dendrite growth that has exceeded a preselected safety length ("dendrite growth threshold"). As is known, dendrite growth can be a significant safety hazard, as dendrite growth can cause short circuiting and fire in a lithium-ion battery. If the maximum delta resistance value exceeds the dendrite growth threshold, the comparator circuitry 703 may trigger alert circuitry 710 (e.g., audible/visible alert), and may also cause battery management circuitry (not shown) to immediately cease any further charging or discharging of the battery. In this example embodiment, the comparison circuitry 706 is also configured to compare the maximum delta resistance to a second threshold that represents a non-recoverable lithium plating has occurred in the battery ("non-recoverable threshold"). If the maximum delta resistance value exceeds the non-recoverable threshold (but remains below the dendrite growth threshold), the system 700 may generate an alert 710 (e.g., audible/visible alert), and may also cause the battery management circuitry to downwardly adjust the charging current to extend the life of the battery. For example, if the maximum delta resistance value exceeds the non-recoverable threshold, the maximum charging current may be reduced to, for example, 50% of maximum charging current. In this example embodiment, the comparison circuitry 706 is also configured to compare the maximum delta resistance to a third threshold that represents a recoverable lithium plating has occurred in the battery ("recoverable threshold").

If the maximum delta resistance value exceeds the recoverable threshold (but remains below the non-recoverable and dendrite growth thresholds), the comparator circuitry 706 may generate an alert 710 (e.g., audible/visible alert), and may also cause the battery management circuitry to downwardly adjust the charging current to extend the life of the battery. For example, the charging current may be set to be 80% of maximum charging current.

The thresholds 709 described above may be provided by the battery manufacturer/supplier and/or derived by experimentation for a given battery type and/or battery class using the pseudo-EIS protocol and determining resistance values, as described in detail above. Such experimentation may include machine learning using a multi-nodal neural network processing architecture, for example, a multi-layer perception architecture, convolution neural network architecture, etc., to generate a model of behavioral characteristics of the battery. The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure. The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML-host informs the actor about the output of the ML algorithm, and the actor decides for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The foregoing example embodiment is directed to determining ZTR based on charging current and voltage. In other embodiments, during charge operations, the battery may be controlled to perform a discharge operation during the interruption phase described herein. In such embodiment, ZTR (discharge) may be determined based on discharge current and voltage. ZTR (discharging), like ZTR (charging, described above), may provide insights into lithium plating and/or other battery degradation characteristics described herein.

Figure 8:
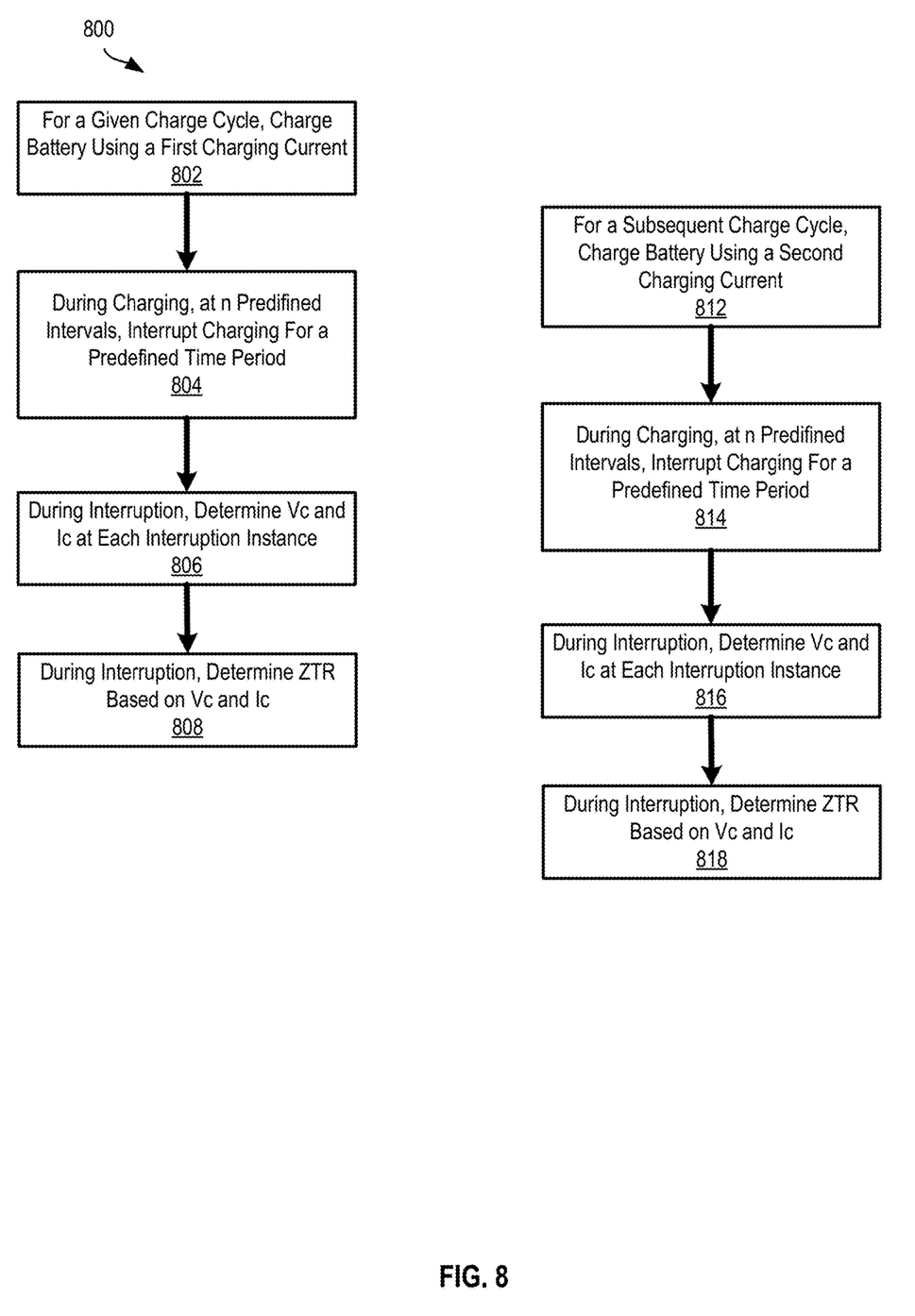
FIG. 8 illustrates a flowchart for monitoring battery performance and degradation according to one embodiment of the present disclosure.

FIG. 8 illustrates a flowchart 800 according to one embodiment of the present disclosure. Operations of this embodiment include, for a given charge cycle, charge a battery using a first charging current 802. Operations also include during charging, at n predefined intervals, interrupt charging for a predefined time period 804. Operations also include during each interruption, determine a terminal voltage (Vc) and the charging current (Ic) 806. Operations also include during each interruption, determine a resistance value (ZTR) based on Vc and Ic 808. The collection of resistance values for the first charging current may be stored for later comparison. Operations of this embodiment also include, for a subsequent charge cycle, charge a battery using a second charging current 812. Operations also include during charging, at n predefined intervals, Interrupt charging for a predefined time period 814. Operations also include during each interruption, determine a terminal voltage (Vc) and the charging current (Ic) 816. Operations also include during each interruption, determine a resistance value (ZTR) based on Vc and Ic 818. The collection of resistance values for the second charging current may be stored for later comparison.

Figure 9:
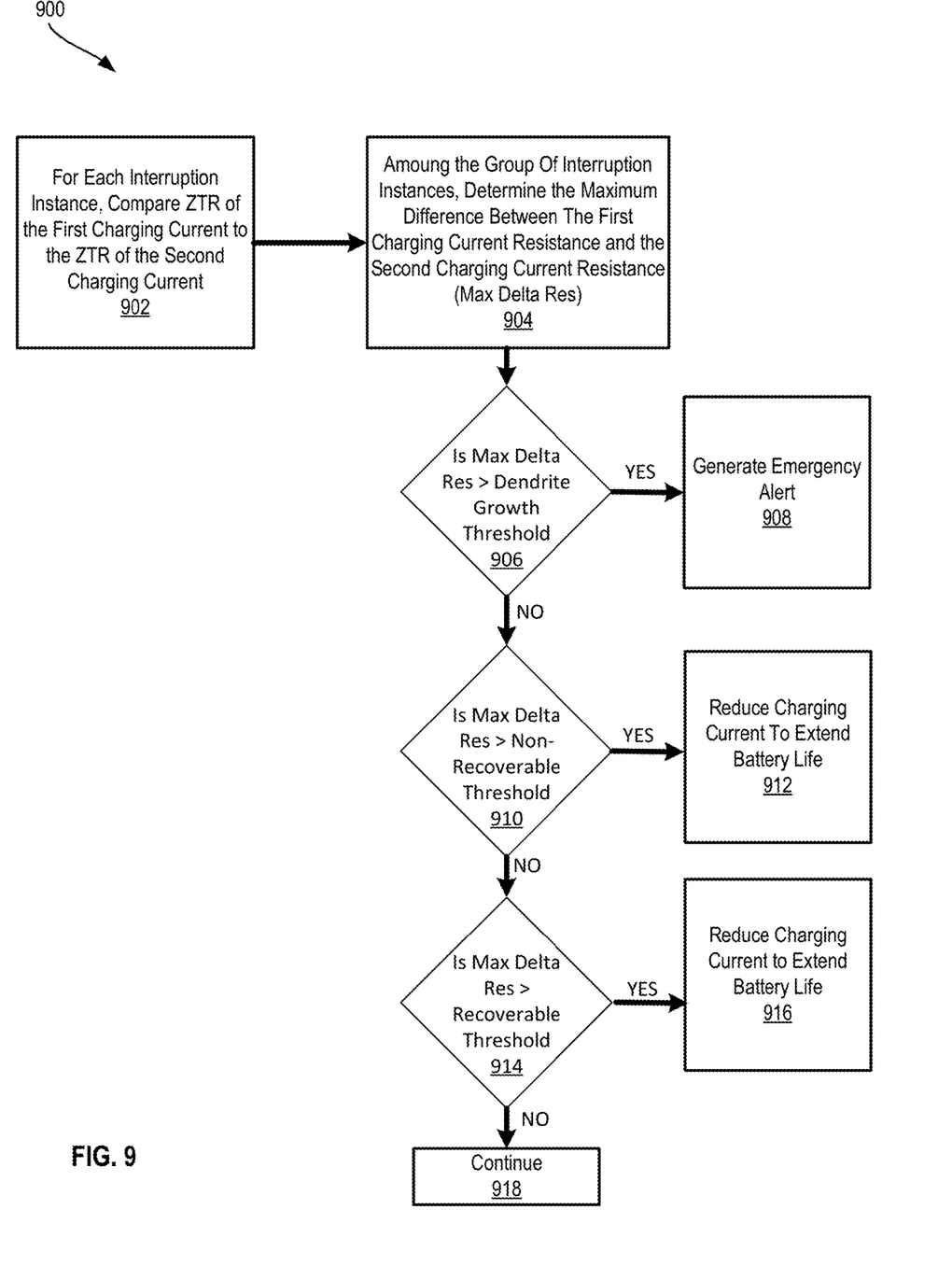
FIG. 9 illustrates a flowchart for monitoring battery performance and degradation according to one embodiment of the present disclosure.

FIG. 9 illustrates a flowchart 900 according to one embodiment of the present disclosure. Operations of this embodiment include, for each interruption instance, compare ZTR of the first charging current with ZTR of the second charging current 902. Operations of this embodiment also include, among the group of interruption instances, determine a maximum difference between the ZTR of the first charging current and ZTR of the second charging current (Max Delta Res) 904. Operations also include determining if Max Delta Res is greater than a dendrite growth threshold 906. If yes, operations include generating an emergency alert 908. If not, operations further include determining if Max Delta Res is greater than a non-recoverable (lithium) plating threshold 910. If yes, operations include reducing a charge current to extend battery life 912. If not, operations further include determining if Max Delta Res is greater than a recoverable (lithium) plating threshold 914. If yes, operations include reducing a charge current to extend battery life 1116, otherwise continuing with charging operations 918.

While FIGS. 8 and 9 illustrate various operations according to one or more embodiments, it is to be understood that not all of the operations depicted in FIG. 8 or 9 are necessary for other embodiments. Indeed, it is fully contemplated herein that in other embodiments of the present disclosure, the operations depicted in FIGS. 8 and/or 9, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" may refer to, for example, software, firmware and/or circuitry configured to perform any of the aforementioned operations. Software may be embodied as a software package, code, instructions, instruction sets and/or data recorded on non-transitory, computer-readable storage devices. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

Any of the operations described herein may be implemented in a system that includes one or more non-transitory storage devices having stored therein, individually or in combination, instructions that when executed by circuitry perform the operations. Here, the circuitry may include any of the aforementioned circuitry including, for example, one or more processors, ASICs, ICs, etc., and/or other programmable circuitry. Also, it is intended that operations described herein may be distributed across a plurality of physical devices, such as processing structures at more than one different physical location. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. Battery testing and monitoring system, comprising:
   impedance determination circuitry to determine a first plurality of impedance values associated with a first charging current and a second plurality of impedance values associated with a second charging current; wherein each of the first and second plurality of impedance values being determined during a charging interruption period; and
   comparison circuitry to compare respective ones of the first plurality of impedance values to respective ones of the second plurality of impedance values, and to determine a maximum compared value representing a maximum difference between the first and second plurality of impedance values; the comparison circuitry also to compare the maximum compared value to one or more thresholds representing aging characteristics of the battery.

2. The system of claim 1, wherein the comparison circuitry to compare the maximum compared value to a first threshold representing a maximum dendrite growth length.

3. The system of claim 2, wherein the comparison circuitry further to generate an alert when the maximum compared value exceeds the first threshold.

4. The system of claim 2, wherein the comparison circuitry to compare the maximum compared value to a second threshold representing non-recoverable lithium plating within the battery.

5. The system of claim 4, wherein the comparison circuitry further to reduce a maximum charging current for the battery.

6. The system of claim 2, wherein the comparison circuitry to compare the maximum compared value to a third threshold representing recoverable lithium plating within the battery.

7. The system of claim 6, wherein the comparison circuitry further to reduce a maximum charging current for the battery.

8. The system of claim 1, wherein the first charging current is less than 25% max charging.

9. The system of claim 1, wherein second charging current is greater than 75% max charging.

10. The system of claim 1, wherein interrupt time period is approximately 3 seconds.

11. The system of claim 1, wherein first impedance values are based on a terminal charging voltage and the first charging current.

12. The system of claim 1, wherein second impedance values are based on a terminal charging voltage and the second charging current.

13. A non-transitory storage device that includes machine-readable instructions that, when executed by one or more processors of a battery charging system, cause the one or more processors to perform operations, comprising:
   determine a first plurality of impedance values associated with a first charging current and a second plurality of impedance values associated with a second charging current; wherein each of the first and second plurality of impedance values being determined during a charging interruption period;
   compare respective ones of the first plurality of impedance values to respective ones of the second plurality of impedance values, and to determine a maximum compared value representing a maximum difference between the first and second plurality of impedance values; and
   compare the maximum compared value to one or more thresholds representing aging characteristics of the battery.

14. The non-transitory storage device of claim 13, wherein the instructions cause the one or more processor to further perform operations, comprising: compare the maximum compared value to a first threshold representing a maximum dendrite growth length.

15. The non-transitory storage device of claim 14, wherein the instructions cause the one or more processor to further perform operations, comprising: generate an alert when the maximum compared value exceeds the first threshold.

16. The non-transitory storage device of claim 14, wherein the instructions cause the one or more processor to further perform operations, comprising: compare the maximum compared value to a second threshold representing non-recoverable lithium plating within the battery.

17. The non-transitory storage device of claim 16, wherein the instructions cause the one or more processor to further perform operations, comprising: reduce a maximum charging current for the battery.

18. The non-transitory storage device of claim 14, wherein the instructions cause the one or more processor to further perform operations, comprising: compare the maximum compared value to a third threshold representing recoverable lithium plating within the battery.

19. The non-transitory storage device of claim 18, wherein the instructions cause the one or more processor to further perform operations, comprising: reduce a maximum charging current for the battery.

20. The non-transitory storage device of claim 13, wherein the first charging current is less than 25% max charging.

21. The non-transitory storage device of claim 13, wherein the second charging current is greater than 75% max charging.

22. The non-transitory storage device of claim 13, wherein the interrupt time period is approximately 3 seconds.

23. The non-transitory storage device of claim 13, wherein the first impedance values are based on a terminal charging voltage and the first charging current.

24. The non-transitory storage device of claim 13, wherein the second impedance values are based on a terminal charging voltage and the second charging current.

* * * * *